United States Patent [19]
Tabota et al.

[11] Patent Number: 5,481,915
[45] Date of Patent: * Jan. 9, 1996

[54] ACCELERATION SENSOR WITH DIRECT MOUNTING

[75] Inventors: Jun Tabota; Muneharu Yamashita; Hiroshi Asano; Toshihiro Mizuno; Jiro Inoue, all of Nagaokakyo, Japan

[73] Assignee: Murata Mfg. Co., Ltd., Japan

[*] Notice: The portion of the term of this patent subsequent to Feb. 14, 2012, has been disclaimed.

[21] Appl. No.: 163,436

[22] Filed: Dec. 8, 1993

[30] Foreign Application Priority Data

Dec. 8, 1992 [JP] Japan ................... 4-328025

[51] Int. Cl.⁶ ..................................... G01P 15/09
[52] U.S. Cl. ..................................... 73/514.34
[58] Field of Search ................ 73/517 R, 517 AV, 73/654; 310/319, 329

[56] References Cited

U.S. PATENT DOCUMENTS 5,063,782  11/1991  Kellett .................. 73/517 R
5,095,751  3/1992   Wada et al. ............ 73/517 R
5,285,097  2/1994   Hirai .................... 73/517 R

*Primary Examiner*—Hezron E. Williams
*Assistant Examiner*—Helen C. Kwok
*Attorney, Agent, or Firm*—Ostrolenk, Faber, Gerb & Soffen

[57] ABSTRACT

An acceleration sensor includes a circuit board having an acceleration signal output electrode and a ground electrode formed on its one major surface, a piezoelectric element fixed on the acceleration signal output electrode, a conductive member fixed on the ground electrode, and a weight member mounted in a crosslinked manner and fixed on the conductive member and the piezoelectric element, and wherein the piezoelectric element is so arranged that its axis of polarization is in a direction along the direction in which acceleration is applied, and the weight member is so constructed that its one surface in contact with the piezoelectric element and the conductive member has conductivity.

17 Claims, 6 Drawing Sheets

ACCELERATION SENSOR WITH DIRECT MOUNTING

BACKGROUND OF THE INVENTION

1. Field of the Invention

The present invention relates generally to an acceleration sensor utilizing a piezoelectric element, and more particularly, to an acceleration sensor suitably integrated into an air bag system which is mounted on an automobile, for example.

2. Description of the Background Art

An air bag system which is carried on an automobile is driven in response to acceleration applied upon a collision or the like. In order to ensure the operation of such an air bag system, an acceleration sensor is generally integrated therein. As this type of acceleration sensor, there has been proposed an acceleration sensor employing a piezoelectric element which is deformed in response to acceleration applied thereto to output an electric signal, as disclosed in U.S. Pat. No. 4,700,973, for example.

An example of a well-known conventional acceleration sensor employing a piezoelectric element will be described with reference to FIGS. 8 and 9.

This acceleration sensor has a piezoelectric element 21 and a hybrid IC 22 including a circuit for processing a detection signal which is outputted from the piezoelectric element 21. An end of the piezoelectric element 21 is fixed to a support member 25 which is fixed on a metal base plate 23. A free end of the piezoelectric element 21 is deflected by acceleration applied along a direction G which is orthogonal to the surface of the support member 25 supporting the piezoelectric element 21, to output a detection signal corresponding to the degree of the acceleration.

The hybrid IC 22 is fixed on the metal base plate 23. In addition, the piezoelectric element 21 and the hybrid IC 22 are electrically connected to each other through lead wires 26. Further, a plurality of pin terminals 27 for electrically connecting the acceleration sensor to an external unit or circuit are mounted so as to extend downward from the metal base plate 23. The piezoelectric element 21 and the hybrid IC 22 are sealed with a cap 24 which is fixed to the metal base plate 23.

In the above-described conventional acceleration sensor, the piezoelectric element 21 is supported by the support member 25 in a cantilevered manner, so that the piezoelectric element 21 is bent/deformed in response to the acceleration applied thereto. When extremely large acceleration is applied, therefore, the free end portion of the piezoelectric element 21 swings remarkably. Consequently, the piezoelectric element 21 itself may be broken when exposed to extremely large acceleration or impact, of about 2000 G, for example.

The piezoelectric element 21 and the hybrid IC 22 are connected to each other by a plurality of lead wires 26 in the above-described acceleration sensor. As a result, the lead wires 26 may be disconnected due to metal fatigue caused by vibration. In order to prevent such disconnection, the diameters of the lead wires 26 may be increased, thereby improving strength. If the diameters of the lead wires 26 are increased, however, the lead wires 26 may resonate with vibration following acceleration, which can exert a bad influence on the acceleration detecting operation of the piezoelectric element 21.

SUMMARY OF THE INVENTION

The present invention overcomes the above-described disadvantages of the conventional acceleration sensor, and provides an acceleration sensor which has increased shock resistance and in superior in reliability.

In accordance with a wide aspect of the present invention, there is provided an acceleration sensor of a first type comprising a circuit board having an acceleration signal output electrode and a ground electrode formed on its one major surface, a piezoelectric element fixed on the acceleration signal output electrode, a conductive member fixed on the ground electrode, and a weight member arranged in a crosslinked manner and fixed on the conductive member and the piezoelectric element, wherein the piezoelectric element is so arranged that its axis of polarization is in a direction along the direction in which acceleration is applied, and the weight member is so constructed that at least its one surface in contact with the piezoelectric element and the conductive member has conductivity.

In the above-described acceleration sensor, the piezoelectric element, which is an acceleration detecting element, is fixed to the circuit board. Even when acceleration applied thereto is small, therefore, the acceleration sensor according to the present invention can sensitively respond to the acceleration and is increased in shock resistance. Accordingly, the acceleration sensor is not easily broken even when extremely large acceleration is applied thereto.

Furthermore, the above-described piezoelectric element is fixed on the acceleration signal output electrode, and is connected in series with the ground electrode through the one surface of the weight member and the conductive member, which have conductivity. Although in the conventional acceleration sensor, the piezoelectric element is connected to other members using lead wires, such a connection structure using lead wires can be omitted in the present invention. Accordingly, disconnection of lead wires can be prevented, and there is no possibility that acceleration is not sufficiently detected due to resonance of lead wires.

In accordance with another wide aspect of the present invention, there is provided an acceleration sensor of a second type comprising a circuit board having an acceleration signal output electrode, an excitation input electrode and a ground electrode formed on its one major surface, first and second piezoelectric elements fixed on the acceleration signal output electrode respectively, and the excitation input electrode, a conductive member fixed on the ground electrode, and a weight member mounted in a crosslinked manner and fixed on the conductive member and the first and second piezoelectric elements, wherein the respective axes of polarization of the first and second piezoelectric elements are arranged along the direction in which acceleration is applied, and the weight member is so constructed that at least its one surface in contact with the first and second piezoelectric elements and the conductive member has conductivity.

This acceleration sensor has increased sensitivity to acceleration and increased shock resistance, similar to the above-described acceleration sensor of the first type according to the present invention. Even when extremely large acceleration is applied, therefore, the acceleration sensor is not easily broken. In addition, the first and second piezoelectric elements are fixed on the acceleration signal output electrode and the excitation input electrode, and are further connected in series with the ground electrode through the one surface of the weight member, thereby making it possible to omit a connection structure using lead wires. Consequently, disconnection of lead wires can be prevented, and there is no possibility that acceleration is not sufficiently detected due to resonance of lead wires, as also achieved in the acceleration sensor of the first type.

Additionally, in the acceleration sensor of the second type, another piezoelectric element, which is a fault detecting element, is arranged in addition to one piezoelectric element which is an acceleration detecting element. Accordingly, it is possible to make fault self-diagnosis of the acceleration sensor by subjecting the piezoelectric element which is an acceleration detecting element to pseudo-vibration, and on the basis of an acceleration signal outputted when the piezoelectric element is subjected to the pseudo-vibration.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
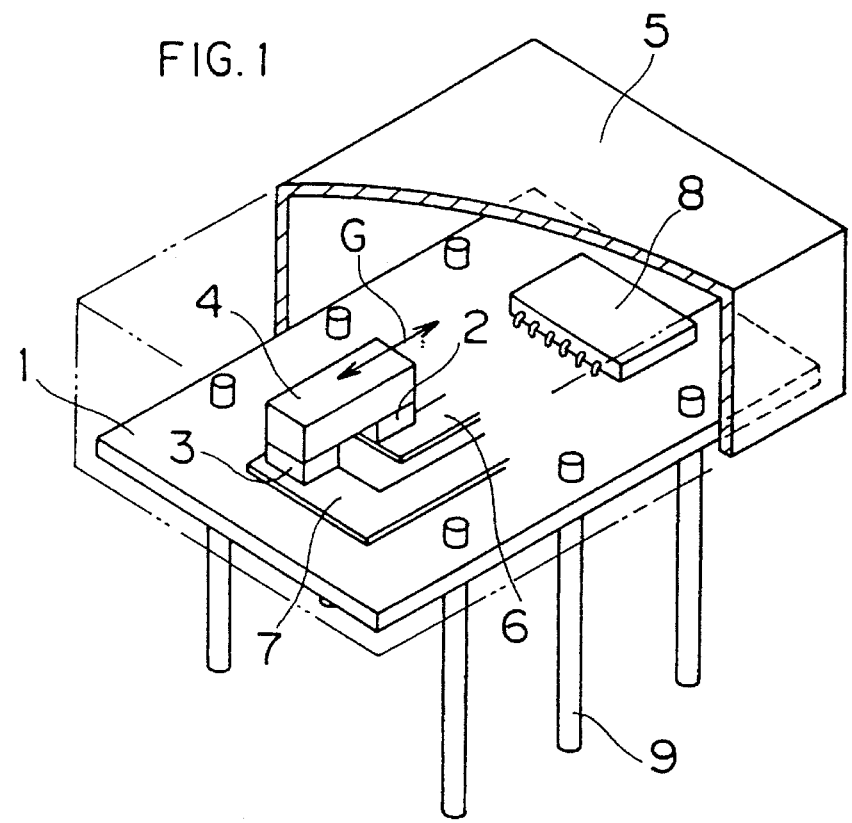
FIG. 1 is a partially fragmented perspective view schematically showing the overall structure of an acceleration sensor according to a first embodiment of the present invention.
Figure 2:
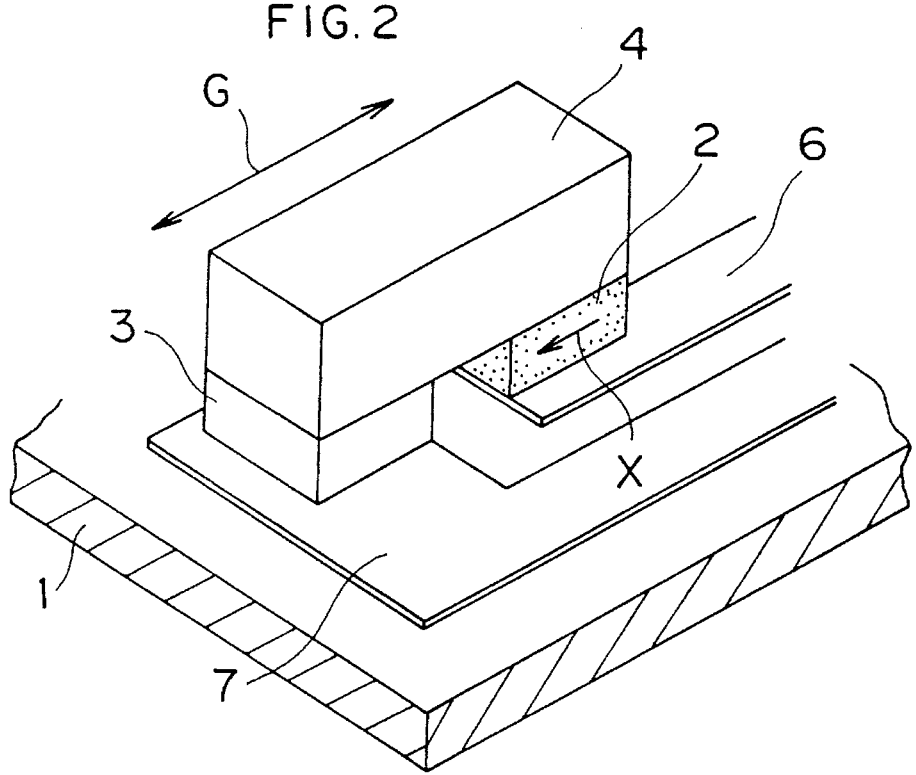
FIG. 2 is a perspective view showing a principal part of the acceleration sensor shown in FIG. 1 in an enlarged manner.

FIG. 1 is a diagram schematically showing the overall structure of an acceleration sensor according to a first embodiment of the present invention, and FIG. 2 is a diagram showing its principal part in an enlarged manner.

As shown in FIG. 1, an acceleration sensor according to the present embodiment comprises a circuit board 1, a piezoelectric element 2 serving as an acceleration detecting element, a conductive member 3, a weight member 4, and a shielding case 5 for sealing the members.

An acceleration signal output electrode 6 and a ground electrode 7 are arranged spaced apart from each other by a predetermined distance on the upper surface of the circuit board 1. In addition, a hybrid IC 8 including an acceleration signal processing circuit (not shown) for processing an acceleration signal outputted from the piezoelectric element 2 is mounted on the upper surface of the circuit board 1. The signal output electrode 6 and the ground electrode 7 are electrically connected to the hybrid IC 8, respectively. Optionally, the hybrid IC 8 may be contained in the circuit board 1. The circuit board having such an internal structure is generally referred to as a hybrid IC substrate, which has been conventionally known.

The above-described piezoelectric element 2 is fixed on the acceleration signal output electrode 6 on the circuit board 1 using conductive adhesive (not shown) or the like, and is electrically connected to the acceleration signal output electrode 6. The piezoelectric element 2 is one in which electrodes are formed on both major surfaces of a block made of piezoelectric ceramics.

Furthermore, the above-described piezoelectric element 2 is so arranged that its axis of polarization X, shown in FIG. 2, is in a direction along the direction in which acceleration is applied G. That is, the direction of the axis of polarization X is set to a direction along the direction in which the piezoelectric element 2 and the conductive member 3 are arranged.

Additionally, a conductive member 3 made of a metal material such as a 42Fe—Ni alloy is fixed on the ground electrode 7 applying a reference potential, and is electrically connected thereto. The weight member 4 made of a conductive material such as the same metal is fixed in such a state as to be mounted in a crosslinked manner on the conductive member 3 and the piezoelectric element 2. This fixing can be achieved using conductive adhesives.

Consequently, the piezoelectric element 2 and the conductive member 3 are electrically connected to each other through the weight member 4.

Figure 10:
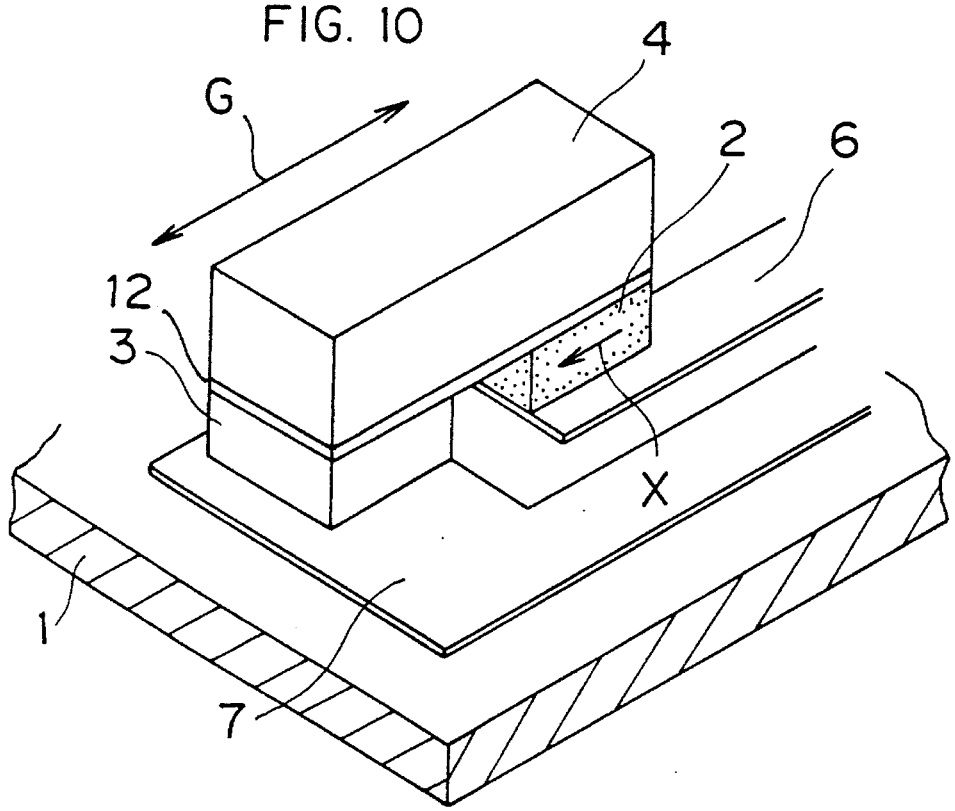
FIG. 10 is a perspective view showing an alternative construction of the principal part shown in FIG. 2.
Figure 11:
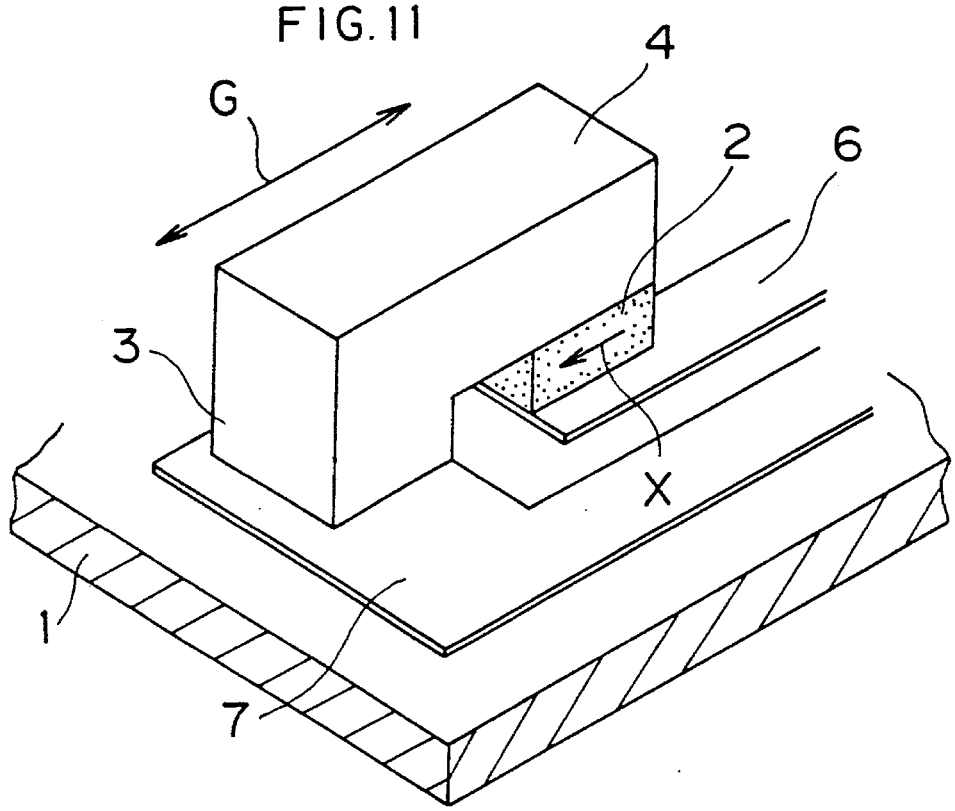
FIG. 11 is a perspective view showing a second alternative construction of the principal part shown in FIG. 2.

The weight member 4 may be so constructed that at least its one surface in contact with the piezoelectric element 2 and the conductive member 3 has conductivity. Consequently, the weight member 4 may be one in which a rectangular parallelepiped block made of ceramics having no conductivity is formed, and silver or the like is deposited over one surface of the block to form a conductive film 12, which is illustrated FIG. 10. In addition, the conductive member 3 and the weight member 4 may be constructed as an integral member, as shown in FIG. 11.

The above-described piezoelectric element 2 is electrically connected to the acceleration signal output electrode 6 by fixing one surface of element 2 on the acceleration signal output electrode 6. On the other hand, the other surface of piezoelectric element 2 is connected in series with the ground electrode 7 respectively through the weight member 4 and the conductive member 3, which have conductivity.

If acceleration is applied along a direction parallel to the axis of polarization X to the piezoelectric element 2 connected as described above, shear strain corresponding to the degree of the acceleration is produced along the direction in which acceleration is applied G in the piezoelectric element 2. Further, positive or negative charges are induced on the surface, on the side of the acceleration signal output electrode 6, of the piezoelectric element 2 due to the production of the shear strain. Positive charges are generated if the direction in which acceleration is applied G and the direction of the axis of polarization X are the same, while negative charges are generated if the directions are opposite to each other.

As a result, the charges generated in the above described manner appear as a voltage because the piezoelectric element 2 has a capacitance. The voltage is outputted through the acceleration signal output electrode 6 and is processed as an acceleration signal from the piezoelectric element 2.

The above-described shielding case 5 is so constructed as to have the shape of a cylinder having a bottom made of a metal or a synthetic resin. The shielding case 5 is fixed to the circuit board 1 so as to cover the circuit board 1. Consequently, the piezoelectric element 2, the conductive member 3, the weight member 4, the hybrid IC 8, and the like are sealed within a space constituted by the circuit board 1 and the shielding case 5.

Although the whole surface of the circuit board 1 is covered with the shielding case 5 in FIG. 1, the acceleration sensor according to the present embodiment is not limited to the same. For example, the shielding case 5 may be one capable of sealing only at least necessary components. Reference numeral 9 in FIG. 1 denotes a pin terminal for connection to an external unit or circuit. The pin terminal 9 is projected outward through the circuit board 1, which is so arranged as to connect the acceleration sensor to other necessary equipment.

Description is now made of the operation of the acceleration sensor according to the first embodiment.

First, if acceleration in the direction in which acceleration is applied G, that is, a direction along the circuit board 1 and a direction along the direction in which the piezoelectric element 2 and the conductive member 3 are arranged, is applied to the above-described acceleration sensor, the weight member 4, which is a mass, is moved and displaced along the direction in which acceleration is applied G and in a range corresponding to the degree of the acceleration. When the weight member 4 is displaced, shear strain is produced in the piezoelectric element 2, interposed between the weight member 4 and the circuit board 1 and having the axis of polarization X parallel to the direction in which acceleration is applied G. As a result, positive charges are induced on the surface, on the side of the acceleration signal output electrode 6, of the piezoelectric element 2 fixed on the acceleration signal output electrode 6. Further, the piezoelectric element 2 is connected in series between the acceleration signal output electrode 6 and the ground electrode 7 at this time, so that the charges induced on the surface of the piezoelectric element 2 are taken out as a voltage through the acceleration signal output electrode 6. Consequently, the voltage is processed through the acceleration signal processing circuit in the hybrid IC 8, thereby to detect the direction and the degree of the acceleration applied.

Figure 3:
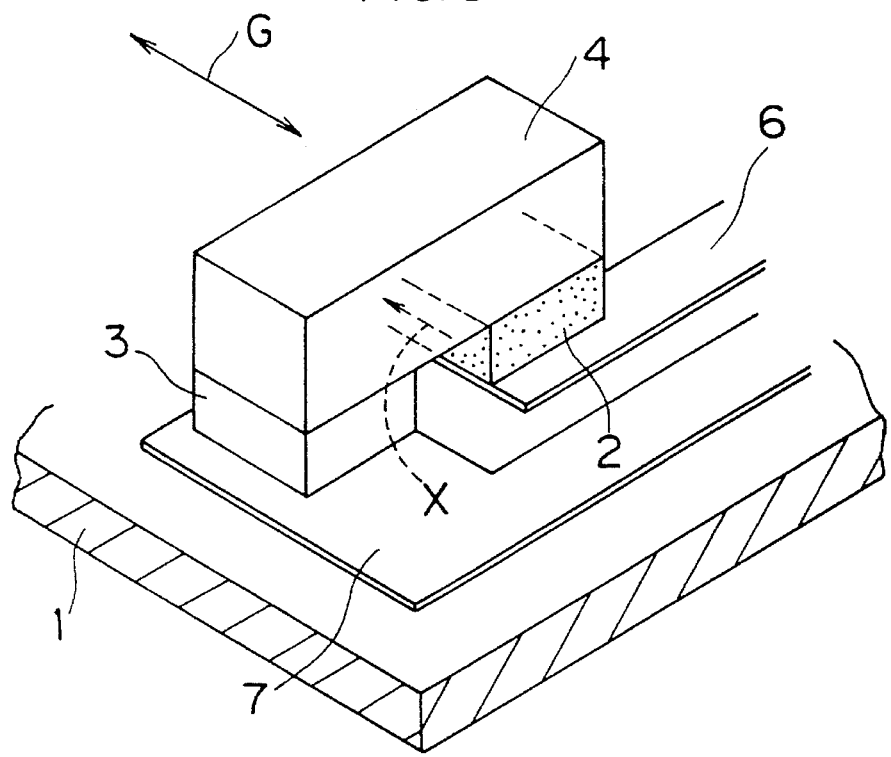
FIG. 3 is a perspective view showing a modified example of the principal part of the acceleration sensor shown in FIG. 2 in an enlarged manner.
Figure 4:
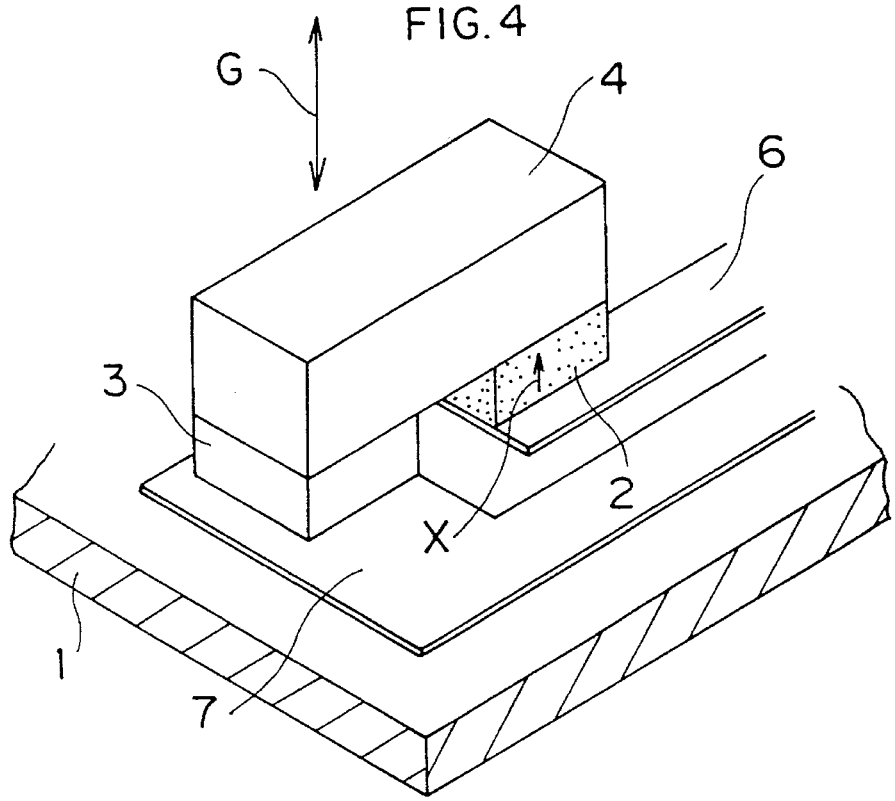
FIG. 4 is a perspective view showing another modified example of the principal part of the acceleration sensor shown in FIG. 2 in an enlarged manner.

Although in FIGS. 1 and 2, the axis of polarization X of the piezoelectric element 2 constituting the acceleration sensor is set along the direction parallel to the circuit board 1 and the direction in which the piezoelectric element 2 and the conductive member 3 are arranged, the axis of polarization X may be set along the direction in which acceleration is applied G such that modified structures as shown in FIGS. 3 and 4 can be employed, for example.

More specifically, in the modified example shown in FIG. 3, the axis of polarization X of a piezoelectric element 2 is set on the basis of the direction in which acceleration is applied G along a direction parallel to a circuit board 1 and orthogonal to the direction in which the piezoelectric element 2 and a conductive member 3 are arranged. In the modified example shown in FIG. 4, the axis of polarization X of a piezoelectric element 2 is set on the basis of the direction in which acceleration is applied G along a direction normal to a circuit board 1. Optionally, the respective directions of the axes of polarization X of the piezoelectric elements 2 may be opposite to the directions as illustrated in the figures.

SECOND EMBODIMENT

An acceleration sensor which is integrated into an air bag system for an automobile should have very high reliability, and a fault developed by the acceleration sensor must be quickly found out. The fault developed by the acceleration sensor has been diagnosed using an external fault diagnosing device separately provided. However, the demand for an acceleration sensor having a so-called fault self-diagnostic function has increased sharply in recent years. An embodiment of such an acceleration sensor having a fault self-diagnostic function will be described.

Figure 5:
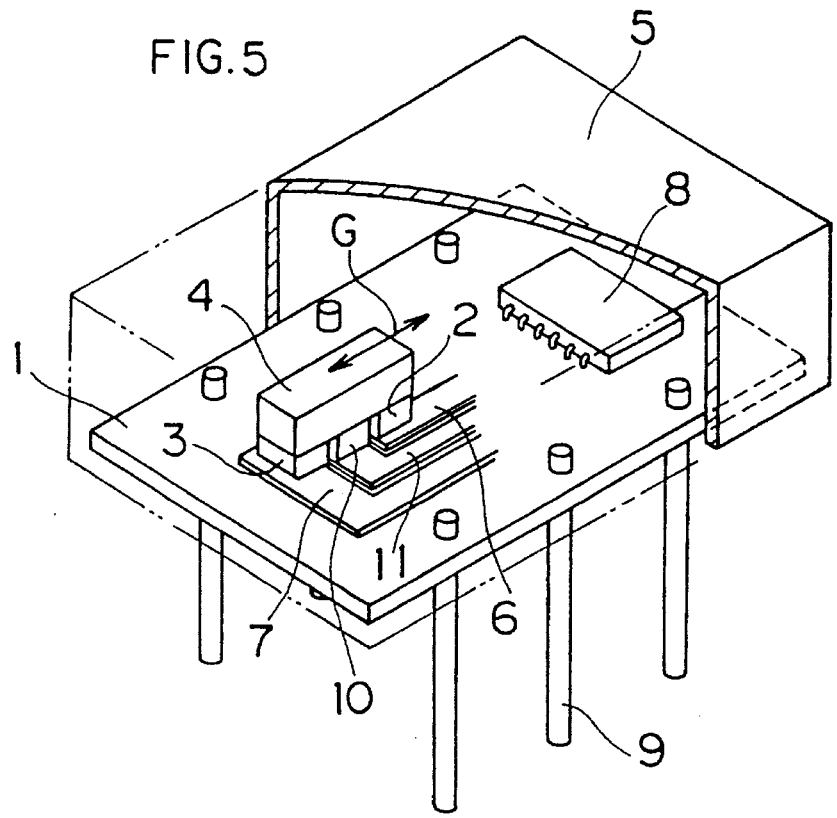
FIG. 5 is a partially fragmented perspective view showing the overall structure of an acceleration sensor according to a second embodiment of the present invention.
Figure 6:
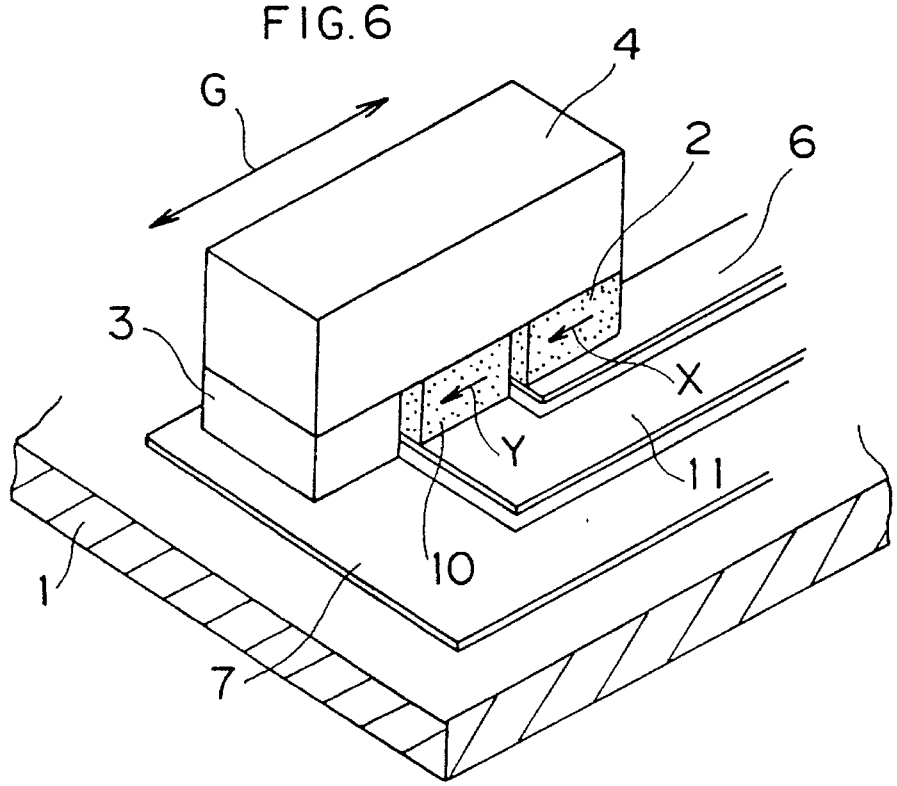
FIG. 6 is a partially fragmented perspective view showing a principal part of the acceleration sensor shown in FIG. 5 in an enlarged manner.
Figure 7:
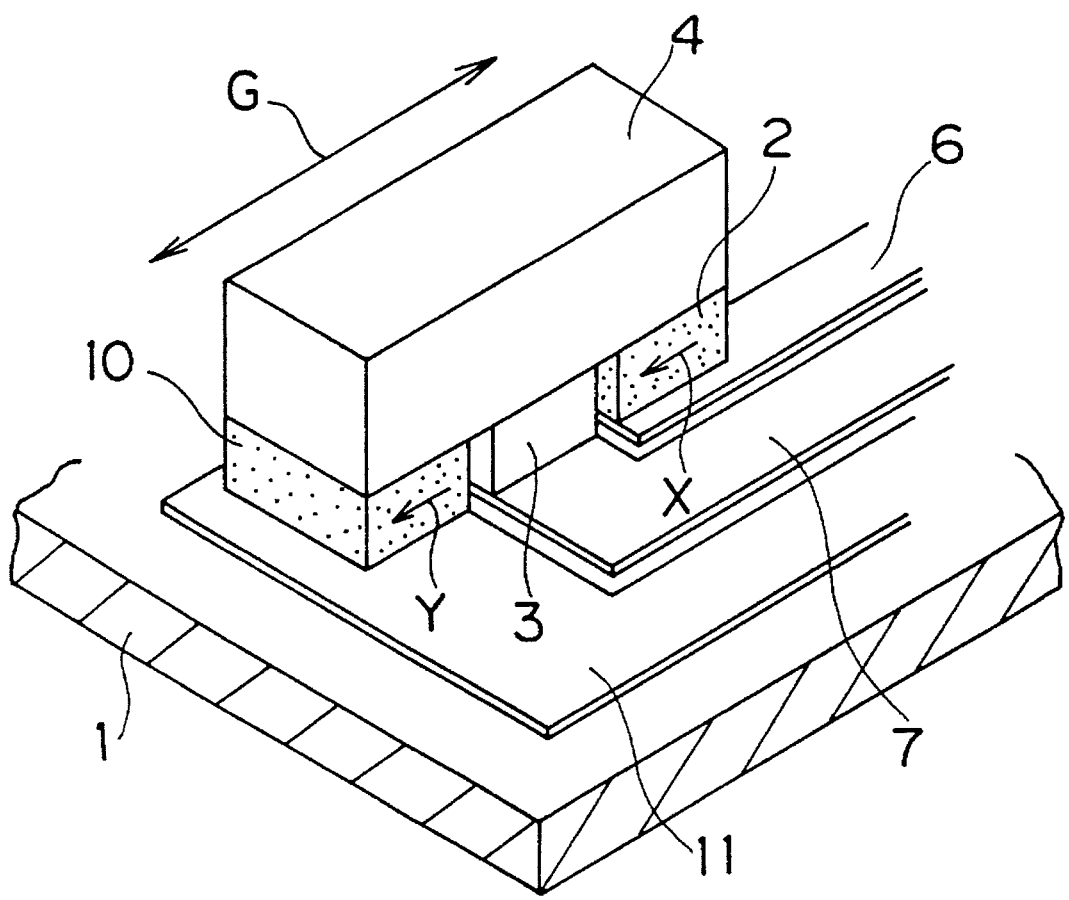
FIG. 7 is a partially fragmented perspective view for explaining a modified example of the principal part of the acceleration sensor according to the second embodiment.
Figure 8:
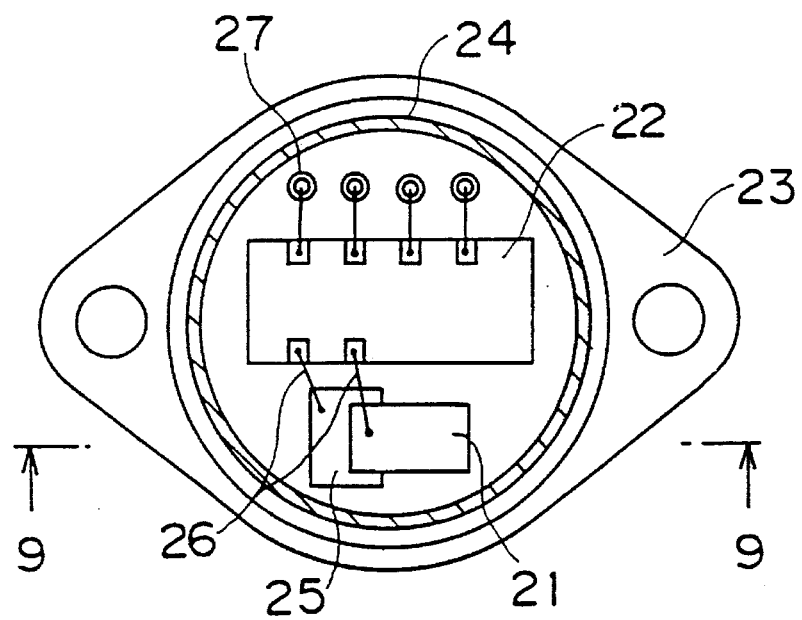
FIG. 8 is a partially fragmented plan sectional view schematically showing the overall structure of a conventional acceleration sensor.
Figure 9:
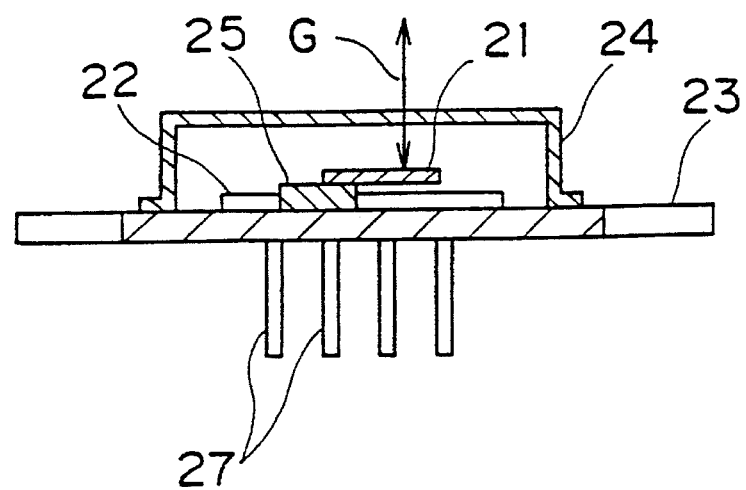
FIG. 9 is a sectional side view taken along a line 9—9 shown in FIG. 8.

FIGS. 5 to 7 show an acceleration sensor according to a second embodiment of the present invention, where FIG. 5 is a partially fragmented perspective view schematically showing the overall structure of an acceleration sensor, FIG. 6 is a partially fragmented perspective view showing only its principal part in an enlarged manner, and FIG. 7 is a partially fragmented perspective view showing a modified example of the principal part. In FIGS. 5 to 7, the same or corresponding components or portions as those shown in FIGS. 1 to 4 showing the first embedment are assigned the same reference numerals and hence, the detailed description is omitted.

As shown in FIG. 5, this acceleration sensor comprises a circuit board 1, a piezoelectric element 2, a conductive agent 3 and a weight member 4 which constitute an acceleration detecting element, and a piezoelectric element 10 which, along with other components, constitutes a fault detecting element, and a shielding case 5 integrally sealing all the components. As illustrated, all the piezoelectric element 2, the conductive member 3, the weight member 4 and the piezoelectric element 10 have a rectangular parallelepiped shape. An acceleration signal output electrode 6, an excitation input electrode 11 and a ground electrode 7 are arranged spaced apart from each other by a predetermined distance on the surface of the circuit board 1, and a hybrid IC 8 including an acceleration signal processing circuit for processing an acceleration signal from the piezoelectric element 2 and an excitation driving circuit for outputting a pseudo-vibration signal for fault diagnosis (neither of which are illustrated) is mounted thereon.

In the present embodiment, the conductive member 3 and the weight member 4, which are components constituting the acceleration detecting element, and the piezoelectric element 10, are combined with each other to constitute the fault detecting element, and the piezoelectric element 10 is fixed oil the excitation input electrode 11 on the circuit board 1 using conductive adhesives (not shown) or the like, as shown in FIG. 6. The piezoelectric element 10 is so arranged that its axis of polarization Y is in a direction along the direction in which acceleration is applied G, that is, a direction parallel to the circuit board 1 and along the direction in which the piezoelectric elements 2 and 10 and the conductive member 3 are arranged, similarly to the axis of polarization X of the piezoelectric element 2.

Furthermore, the piezoelectric element 2 is fixed on the acceleration signal output electrode 6 on the circuit board 1, while the conductive member 3 is fixed on the ground electrode 7 and connected thereto. The weight member 4, at least one surface of which has conductivity, is mounted in a crosslinked manner and fixed on both the piezoelectric elements 2 and 10 and the conductive member 3. Therefore, the piezoelectric element 2 and the conductive member 3, constituting the acceleration detecting element, are integrated with the piezoelectric element 10 through the weight member 4, and the piezoelectric elements 2 and 10 are connected to each other through the weight member 4.

More specifically, one surface of the piezoelectric element 10 is fixed on the excitation input electrode 11, while another one surface thereof is connected in series with the ground electrode 7 respectively through the weight member 4 and the conductive member 3, which have conductivity. If a pseudo-vibration signal is applied, from an excitation driving circuit integrated into the hybrid IC 8, to the piezoelectric element 10 through the excitation input electrode 11, therefore, the piezoelectric element 10 is distorted along a direction parallel to the axis of polarization Y. The weight member 4 is displaced due to the distortion of the piezoelectric element 10. Consequently, charges are induced, for the reasons described in the first embodiment, on the surface, on the side of the acceleration signal output electrode 6, of the piezoelectric element 2 through the displacement of the weight member 4. If an output thus obtained, based on the pseudo-vibration signal, is processed in the same manner as a normal acceleration signal, the presence or absence of a fault developed by the acceleration sensor is diagnosed.

Although in FIGS. 5 and 6, the piezoelectric elements 2 and 10 and the conductive member 3 are arranged in the order shown and are spaced apart from each other by a predetermined distance, the present invention is not limited to this arrangement. For example, a conductive member 3 may be arranged between both piezoelectric elements 2 and 10, as shown in FIG. 7. In addition, the respective axes of polarization X and Y of the piezoelectric elements 2 and 10 may be set along the direction in which acceleration is applied G. The directions of the axes of polarization X and Y are not limited, just as in the first embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An acceleration sensor comprising:
    a circuit board having an acceleration signal output electrode and a ground electrode formed directly on one major surface of the circuit board;
    a piezoelectric element fixed on said acceleration signal output electrode and having an axis of polarization;
    a conductive member fixed on said ground electrode; and
    a weight member fixed on said conductive member and said piezoelectric element, and conductively connecting said conductive member to said piezoelectric element, and wherein
    said axis of polarization of said piezoelectric element is substantially parallel to a direction in which acceleration is applied.

2. The acceleration sensor according to claim 1, wherein said circuit board comprises an acceleration signal processing circuit.

3. The acceleration sensor according to claim 2, wherein said acceleration signal processing circuit is constituted by a hybrid IC mounted on said circuit board.

4. The acceleration sensor according to claim 1, wherein said weight member is made of a conductive material.

5. The acceleration sensor according to claim 1, wherein said weight member comprises a block and a conductive film formed on one surface of the block, the conductive film conductively connecting said conductive member to said weight member.

6. The acceleration sensor according to claim 1, wherein said conductive member and said weight member are formed as an integral unit.

7. The acceleration sensor according to claim 1, further comprising a shielding case mounted on said circuit board so as to cover the one major surface of the circuit board,
    at least said piezoelectric element, said conductive member and said weight member being contained in a shielded space constituted by the shielding case and the circuit board.

8. The acceleration sensor according to claim 1, wherein said piezoelectric element and said conductive member are arranged in a direction along the axis of polarization of said piezoelectric element.

9. The acceleration sensor according to claim 1, further comprising an excitation input electrode formed on the one major surface of said circuit board and a second piezoelectric element fixed on the excitation input electrode,
    said weight member fixed on said piezoelectric element, said second piezoelectric element and said conductive member, said weight member conductively connecting said piezoelectric element, said second piezoelectric element and said conductive member, each to the other.

10. The acceleration sensor according to claim 9, wherein said circuit board comprises an acceleration signal processing circuit.

11. The acceleration sensor according to claim 10, wherein said acceleration signal processing circuit is constituted by a hybrid IC mounted on the circuit board.

12. The acceleration sensor according to claim 9, wherein said weight member is made of a conductive material.

13. The acceleration sensor according to claim 9, wherein said weight member comprises a block and a conductive film formed on one surface of the block, the conductive film conductively connecting said piezoelectric element, said second piezoelectric element and said conductive member, each to the other.

14. The acceleration sensor according to claim 9, wherein said conductive member and said weight member are formed as an integral unit.

15. The acceleration sensor according to claim 9, further comprising a shielding case mounted on said circuit board so as to cover the one major surface of the circuit board,
    at least said piezoelectric element, said second piezoelectric element, said conductive member and said weight member being contained in a sealed space constituted by the shielding case and the circuit board.

16. The acceleration sensor according to claim 9, wherein said conductive member is arranged between said piezoelectric element and said second piezoelectric element.

17. An acceleration sensor comprising:

a circuit board having an acceleration signal output electrode, an excitation input electrode and a ground electrode formed directly on one major surface of the circuit board;

a first piezoelectric element fixed on said acceleration signal output electrode;

a second piezoelectric element fixed on said excitation input electrode for generating a fault-detecting pseudo-vibration;

a conductive member fixed on said ground electrode; and a weight member fixed on said conductive member and said first and second piezoelectric elements, said weight member conductively connecting said conductive member, and said first and second piezoelectric elements, each to the other, and wherein said first and second piezoelectric elements each have an axis of polarization, each respective axis of polarization being substantially parallel to a direction in which acceleration is applied.

* * * * *